US009805479B2

United States Patent
Taraki et al.

(10) Patent No.: US 9,805,479 B2
(45) Date of Patent: Oct. 31, 2017

(54) SESSION IDLE OPTIMIZATION FOR STREAMING SERVER

(71) Applicant: Amazon Technologies, Inc., Reno, NV (US)

(72) Inventors: Quais Taraki, Bellevue, WA (US); Matthew Vahlsing, Seattle, WA (US); Vinod Murli Mamtani, Bellevue, WA (US); James Jonathan Morris, Duvall, WA (US); Gerard Joseph Heinz, II, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/077,146

(22) Filed: Nov. 11, 2013

(65) Prior Publication Data

US 2015/0130813 A1    May 14, 2015

(51) Int. Cl.
    *G06T 11/00* (2006.01)
    *G06F 9/455* (2006.01)
    *G06T 1/20* (2006.01)

(52) U.S. Cl.
    CPC ........ *G06T 11/001* (2013.01); *G06F 9/45558* (2013.01); *G06T 1/20* (2013.01); *G06F 2009/45575* (2013.01)

(58) Field of Classification Search
    None
    See application file for complete search history.

(56) References Cited

U.S. PATENT DOCUMENTS

| 5,774,668 | A | 6/1998 | Choquier et al. |
| 5,956,489 | A | 9/1999 | San Andreas et al. |
| 6,343,313 | B1 | 1/2002 | Salesky et al. |
| 6,525,731 | B1 | 2/2003 | Suits et al. |
| 6,556,206 | B1 | 4/2003 | Benson et al. |
| 6,694,346 | B1 * | 2/2004 | Aman et al. .................. 718/104 |
| 6,941,078 | B1 | 9/2005 | Onaka |
| 7,068,729 | B2 | 6/2006 | Shokrollahi et al. |
| 7,177,448 | B1 | 2/2007 | Sah |
| 7,249,291 | B2 | 7/2007 | Rasmussen et al. |
| 7,447,235 | B2 | 11/2008 | Luby et al. |

(Continued)

FOREIGN PATENT DOCUMENTS

| EP | 2073486 A1 | 6/2009 |
| JP | 2000-132705 A | 5/2000 |

(Continued)

OTHER PUBLICATIONS

U.S. Appl. No. 14/317,441, Jun. 27, 2014, Kalman et al.
http://commons.wikimedia.org/wiki/File:Stereoscopic 3D_render_from_Blender.jpg; File: Stereoscopic 3D render from Blender.jpg; Wikimedia; Mar. 4, 2012; accessed Nov. 12, 2013; 2 pages.

(Continued)

*Primary Examiner* — Yu Chen
(74) *Attorney, Agent, or Firm* — Baker & Hostetler LLP

(57) ABSTRACT

Graphics rendering services may be provided to a client device by a remote computing facility. One or more rendering processes may be executed on a virtual machine operating on a host computing device. Client state information may be monitored to detect periods of inactivity. A rendering process may be inactivated by suspending the virtual machine on which it executes. Upon resumption of activity, the rendering process may be reactivated by resuming execution of the virtual machine.

19 Claims, 8 Drawing Sheets

(56) References Cited

U.S. PATENT DOCUMENTS

| | | |
|---|---|---|
| 7,522,167 B1 | 4/2009 | Diard et al. |
| 7,548,242 B1 | 6/2009 | Hughes et al. |
| 7,616,206 B1 | 11/2009 | Danilak |
| 7,616,207 B1 | 11/2009 | Diard et al. |
| 7,623,131 B1 | 11/2009 | Johnson |
| 7,660,245 B1 | 2/2010 | Luby |
| 7,711,068 B2 | 5/2010 | Shokrollahi et al. |
| 7,720,174 B2 | 5/2010 | Shokrollahi et al. |
| 7,721,184 B2 | 5/2010 | Luby et al. |
| 7,956,772 B2 | 6/2011 | Shokrollahi et al. |
| 7,969,444 B1 | 6/2011 | Biermann et al. |
| 7,984,179 B1 | 7/2011 | Huang |
| 8,065,676 B1 | 11/2011 | Sahai et al. |
| 8,185,809 B2 | 5/2012 | Luby et al. |
| 8,190,760 B2 | 5/2012 | Hurst et al. |
| 8,279,755 B2 | 10/2012 | Luby |
| 8,458,567 B2 | 6/2013 | Luby et al. |
| 8,473,557 B2 | 6/2013 | Ramakrishnan et al. |
| 8,478,816 B2 | 7/2013 | Parks et al. |
| 8,484,284 B2 | 7/2013 | Elliott et al. |
| 8,527,646 B2 | 9/2013 | Khatib et al. |
| 8,572,251 B2 | 10/2013 | Srinivas et al. |
| 8,574,074 B2 | 11/2013 | Van Datta et al. |
| 8,671,163 B2 | 3/2014 | Luby et al. |
| 8,795,076 B2 | 8/2014 | Van Datta et al. |
| 8,838,722 B2 | 9/2014 | Ridges et al. |
| 8,928,659 B2 | 1/2015 | Bar-Zeev et al. |
| 8,996,864 B2 * | 3/2015 | Maigne ............... G06F 9/45533 713/164 |
| 9,192,859 B2 | 11/2015 | Perlman et al. |
| 9,466,074 B2 | 10/2016 | Van Datta et al. |
| 2002/0114404 A1 | 8/2002 | Aizawa et al. |
| 2002/0129159 A1 | 9/2002 | Luby et al. |
| 2002/0147611 A1 | 10/2002 | Greene et al. |
| 2002/0173984 A1 | 11/2002 | Robertson et al. |
| 2002/0176367 A1 | 11/2002 | Gross |
| 2003/0091000 A1 | 5/2003 | Chu et al. |
| 2003/0105925 A1 | 6/2003 | Yoshimura et al. |
| 2003/0212742 A1 | 11/2003 | Hochmuth et al. |
| 2004/0057379 A1 | 3/2004 | Chen et al. |
| 2004/0073903 A1 | 4/2004 | Melchione et al. |
| 2004/0093206 A1 | 5/2004 | Hardwick |
| 2004/0098748 A1 | 5/2004 | Bo et al. |
| 2004/0101274 A1 | 5/2004 | Foisy et al. |
| 2004/0153316 A1 | 8/2004 | Hardwick |
| 2005/0135305 A1 | 6/2005 | Wentink |
| 2006/0036756 A1 | 2/2006 | Driemeyer et al. |
| 2006/0061651 A1 | 3/2006 | Tetterington |
| 2006/0072831 A1 | 4/2006 | Pallister |
| 2006/0088093 A1 | 4/2006 | Lakaniemi et al. |
| 2006/0168147 A1 | 7/2006 | Inoue et al. |
| 2007/0009043 A1 | 1/2007 | Craig et al. |
| 2007/0053692 A1 | 3/2007 | Hoshida et al. |
| 2007/0094094 A1 | 4/2007 | Yaron et al. |
| 2007/0140359 A1 | 6/2007 | Ehret et al. |
| 2007/0156725 A1 | 7/2007 | Ehret et al. |
| 2007/0183493 A1 | 8/2007 | Kimpe |
| 2007/0226364 A1 | 9/2007 | Landspurg |
| 2007/0265073 A1 | 11/2007 | Novi et al. |
| 2008/0008093 A1 | 1/2008 | Wang et al. |
| 2008/0104608 A1 * | 5/2008 | Hyser et al. ................ 718/105 |
| 2008/0172140 A1 | 7/2008 | Kim et al. |
| 2008/0281793 A1 | 11/2008 | Mathur |
| 2009/0131177 A1 | 5/2009 | Pearce |
| 2009/0150750 A1 | 6/2009 | Liu et al. |
| 2009/0195537 A1 | 8/2009 | Qiu et al. |
| 2009/0245426 A1 | 10/2009 | Ratnakar et al. |
| 2009/0249440 A1 | 10/2009 | Platt et al. |
| 2009/0251488 A1 | 10/2009 | Clavel |
| 2009/0307565 A1 | 12/2009 | Luby et al. |
| 2010/0017686 A1 | 1/2010 | Luby et al. |
| 2010/0063992 A1 | 3/2010 | Ma et al. |
| 2010/0088453 A1 | 4/2010 | Solki et al. |
| 2010/0156892 A1 | 6/2010 | Chan et al. |
| 2010/0166058 A1 | 7/2010 | Perlman et al. |
| 2010/0166063 A1 | 7/2010 | Perlman et al. |
| 2010/0166065 A1 | 7/2010 | Perlman et al. |
| 2010/0166068 A1 | 7/2010 | Perlman et al. |
| 2010/0218014 A1 | 8/2010 | Bozek et al. |
| 2010/0289803 A1 | 11/2010 | Klosowski et al. |
| 2010/0312891 A1 | 12/2010 | Pairault et al. |
| 2011/0002377 A1 | 1/2011 | Raveendran |
| 2011/0002378 A1 | 1/2011 | Raveendran |
| 2011/0002379 A1 | 1/2011 | Raveendran |
| 2011/0002399 A1 | 1/2011 | Raveendran |
| 2011/0002405 A1 | 1/2011 | Raveendran |
| 2011/0040894 A1 | 2/2011 | Shrum et al. |
| 2011/0055372 A1 * | 3/2011 | Elyashev et al. ............ 709/224 |
| 2011/0055602 A1 * | 3/2011 | Kamay et al. ................ 713/320 |
| 2011/0125746 A1 | 5/2011 | Leary et al. |
| 2011/0134098 A1 * | 6/2011 | Stone ............................ 345/419 |
| 2011/0157193 A1 | 6/2011 | Boucher et al. |
| 2011/0252181 A1 | 10/2011 | Ouye et al. |
| 2011/0252356 A1 * | 10/2011 | Morris ................. G06F 9/4443 715/772 |
| 2011/0276689 A1 | 11/2011 | Rosen |
| 2011/0283045 A1 | 11/2011 | Krishnan et al. |
| 2011/0304634 A1 | 12/2011 | Urbach |
| 2012/0004040 A1 | 1/2012 | Pereira et al. |
| 2012/0004041 A1 | 1/2012 | Pereira et al. |
| 2012/0004042 A1 | 1/2012 | Perry et al. |
| 2012/0005316 A1 | 1/2012 | Perry et al. |
| 2012/0069036 A1 | 3/2012 | Dharmapurikar |
| 2012/0084774 A1 | 4/2012 | Post et al. |
| 2012/0089980 A1 | 4/2012 | Sharp et al. |
| 2012/0093252 A1 | 4/2012 | Strait |
| 2012/0117145 A1 | 5/2012 | Clift et al. |
| 2012/0141089 A1 | 6/2012 | Hunt |
| 2012/0173715 A1 | 7/2012 | Selitser et al. |
| 2012/0182387 A1 | 7/2012 | Enenkl et al. |
| 2012/0188341 A1 | 7/2012 | Klien et al. |
| 2012/0192031 A1 | 7/2012 | Liu et al. |
| 2012/0206572 A1 | 8/2012 | Russell |
| 2012/0209933 A1 | 8/2012 | Ridges et al. |
| 2012/0224490 A1 | 9/2012 | Ikada |
| 2012/0268553 A1 | 10/2012 | Talukder |
| 2012/0281962 A1 | 11/2012 | Hunt et al. |
| 2012/0331147 A1 | 12/2012 | Dutta et al. |
| 2013/0007499 A1 | 1/2013 | Moy |
| 2013/0016107 A1 | 1/2013 | Dharmapurikar |
| 2013/0024812 A1 * | 1/2013 | Reeves ................. G06F 3/1423 715/810 |
| 2013/0031161 A1 * | 1/2013 | Yang .......................... 709/203 |
| 2013/0036476 A1 | 2/2013 | Roever et al. |
| 2013/0038618 A1 | 2/2013 | Urbach |
| 2013/0067469 A1 | 3/2013 | Das et al. |
| 2013/0106855 A1 | 5/2013 | Urbach |
| 2013/0151683 A1 | 6/2013 | Jain et al. |
| 2013/0151803 A1 | 6/2013 | Tofano |
| 2013/0210522 A1 | 8/2013 | Dharmapurikar |
| 2013/0322517 A1 | 12/2013 | Zurpal et al. |
| 2013/0326024 A1 | 12/2013 | Chen et al. |
| 2013/0344960 A1 | 12/2013 | Perry et al. |
| 2013/0344961 A1 | 12/2013 | Iannetta |
| 2013/0344966 A1 | 12/2013 | Mustafa |
| 2014/0025710 A1 | 1/2014 | Sarto |
| 2014/0108967 A1 | 4/2014 | Markham et al. |
| 2014/0143301 A1 | 5/2014 | Watson et al. |
| 2014/0171186 A1 | 6/2014 | Arnone et al. |
| 2014/0173060 A1 | 6/2014 | Jubran et al. |
| 2014/0173674 A1 | 6/2014 | Wolman et al. |
| 2014/0176583 A1 | 6/2014 | Abiezzi et al. |
| 2014/0267283 A1 | 9/2014 | Nystad et al. |
| 2014/0279581 A1 | 9/2014 | Devereaux et al. |
| 2014/0297798 A1 | 10/2014 | Bakalash et al. |
| 2014/0337835 A1 * | 11/2014 | Johnson ............... G06F 9/45558 718/1 |
| 2014/0364228 A1 | 12/2014 | Rimon |
| 2015/0019965 A1 | 1/2015 | Roberts et al. |
| 2015/0084981 A1 | 3/2015 | Clarberg |
| 2015/0091903 A1 | 4/2015 | Costello et al. |
| 2015/0130789 A1 | 5/2015 | Heinz et al. |
| 2015/0130814 A1 | 5/2015 | Taraki et al. |
| 2015/0130815 A1 | 5/2015 | Taraki et al. |

(56) References Cited

U.S. PATENT DOCUMENTS

| | | | |
|---|---|---|---|
| 2015/0131969 A1 | 5/2015 | Taraki et al. |
| 2015/0133214 A1 | 5/2015 | Heath et al. |
| 2015/0133215 A1 | 5/2015 | Heinz et al. |
| 2015/0133216 A1 | 5/2015 | Heinz et al. |
| 2015/0134770 A1 | 5/2015 | Heinz et al. |
| 2015/0134771 A1 | 5/2015 | Kalman et al. |
| 2015/0134772 A1 | 5/2015 | Heinz et al. |
| 2015/0134779 A1 | 5/2015 | Thompson et al. |
| 2015/0134840 A1 | 5/2015 | Thompson et al. |
| 2015/0142925 A1 | 5/2015 | Hix et al. |
| 2015/0187333 A1 | 7/2015 | Loeffler et al. |
| 2015/0200983 A1 | 7/2015 | Pearce et al. |
| 2015/0249623 A1 | 9/2015 | Phillips et al. |
| 2015/0331813 A1 | 11/2015 | Perrin et al. |

FOREIGN PATENT DOCUMENTS

| | | |
|---|---|---|
| JP | 2004-266575 A | 9/2004 |
| JP | 2006-061716 A | 3/2006 |
| JP | 2006-279544 A | 10/2006 |
| JP | 2009-003584 A | 1/2009 |
| JP | 2010-224914 A | 10/2010 |
| JP | 2012-143012 A | 7/2012 |
| JP | 2012-245347 A | 12/2012 |
| WO | 2012/079825 A1 | 6/2012 |
| WO | WO 2012/107739 A2 | 8/2012 |
| WO | WO 2013/069654 A1 | 5/2013 |

OTHER PUBLICATIONS http://en.wikipedia.org/wiki/Mipmap; Mipmap; Wikipedia; Oct. 29, 2013; accessed Nov. 10, 2013; 3 pages.

http://en.wikipeida.org/wiki/Texture_atlas; Texture atlas; Wikipedia; Sep. 28, 2013; accessed Nov. 10, 2013; 2 pages.

http://msdn.microsoft.com/en-us/library/windows/hardware/ff569022(v=vs.85).aspx; Pipelines for Direct3D Version 11; Microsoft; Oct. 14, 2013; accessed Nov. 9, 2013; 3 pages.

European Patent Application No. 14860565.2; Extended Search Report; dated May 10, 2017; 9 pages.

European Patent Application No. 14859905.3; Extended Search Report; dated Jun. 27, 2017; 10 pages.

"Remote Session Environment"; https://technet.microsoft.com/de-de/library/ee791847(v=ws.10).aspx; Microsoft; ©2017; accessed Jul. 18, 2017; 8 pages.

Hasselgren et al.; "An Efficient Multi-View Rasterization Architecture"; Proceedings of the $17^{th}$ Eurographics Conf. On Rendering Techniques; Jun. 2006; 12 pages.

Sorbier et al.; "GPU-based multi-view rendering"; $3^{rd}$ Annual Int'l Conf. On Computer Games, Multimedia and Allied Technology (CGAT); 2010; 8 pages.

Hubner et al.; "Single-Pass Multi-View Rendering"; IADIS Int'l Journal on Computer Science and Information Systems; vol. 2 No. 2; 2007; pp. 122-140.

European Patent Application No. 14860984.5; Extended Search Report; dated May 26, 2017; 14 pages.

* cited by examiner

SESSION IDLE OPTIMIZATION FOR STREAMING SERVER

CROSS REFERENCE TO RELATED APPLICATIONS

This application is related to the following applications, each of which is hereby incorporated by reference in its entirety: U.S. patent application Ser. No. 14/076,718 filed Nov. 11, 2013, entitled "VIDEO ENCODING BASED ON AREAS OF INTEREST"; U.S. patent application Ser. No. 14/076,821 filed Nov. 11, 2013, entitled "ADAPTIVE SCENE COMPLEXITY BASED ON SERVICE QUALITY"; U.S. patent application Ser. No. 14/077,127 filed Nov. 11, 2013, entitled "SERVICE FOR GENERATING GRAPHICS OBJECT DATA"; U.S. patent application Ser. No. 14/077,136 filed Nov. 11, 2013, entitled "IMAGE COMPOSITION BASED ON REMOTE OBJECT DATA"; U.S. patent application Ser. No. 14/077,165 filed Nov. 11, 2013, entitled "MULTIPLE PARALLEL GRAPHICS PROCESSING UNITS"; U.S. patent application Ser. No. 14/077,084 filed Nov. 11, 2013, entitled "ADAPTIVE CONTENT TRANSMISSION"; U.S. patent application Ser. No. 14/077,180 filed Nov. 11, 2013, entitled "VIEW GENERATION BASED ON SHARED STATE"; U.S. patent application Ser. No. 14/077,186 filed Nov. 11, 2013, entitled "MULTIPLE STREAM CONTENT PRESENTATION"; U.S. patent application Ser. No. 14/077,149 filed Nov. 11, 2013, entitled "DATA COLLECTION FOR MULTIPLE VIEW GENERATION"; U.S. patent application Ser. No. 14/077,142 filed Nov. 11, 2013, entitled "STREAMING GAME SERVER VIDEO RECORDER"; U.S. patent application Ser. No. 14/076,815 filed Nov. 11, 2013, entitled "LOCATION OF ACTOR RESOURCES"; U.S. patent application Ser. No. 14/077,023 filed Nov. 11, 2013, entitled "APPLICATION STREAMING SERVICE"; U.S. patent application Ser. No. 61/902,740 filed Nov. 11, 2013, entitled "EFFICIENT BANDWIDTH ESTIMATION".

BACKGROUND

Computing devices such as mobile phones, tablet computers, game consoles and so forth may not be equipped to render graphics with speed and detail sufficient for certain applications. Rendering graphics, which may be described as a process for generating images for use in games and other computer applications, may utilize specialized computing resources such as graphics processing units that may not be available on a computing device. In some cases, resources may be available but would consume excess power, or would run at an insufficient speed or provide an insufficient level of graphical quality.

Graphics rendering capabilities may be provided to a client device by computing resources located at a remote facility. The facility may, for example, be equipped with banks of graphical processing units ("GPUs") or other hardware specialized for the provision of rendering services. However, even with the use of specialized hardware, the provision of graphics rendering services may consume significant amounts of computing resources. For example, graphics rendering may involve loading various models, textures, bitmaps and so forth into memory. These resources may be retained in memory while a dependent process is running on a client device. Management of resource utilization may improve the performance and efficiency of the rendering service.

BRIEF DESCRIPTION OF DRAWINGS

The following detailed description may be better understood when read in conjunction with the appended drawings. For the purposes of illustration, there are shown in the drawings example embodiments of various aspects of the disclosure; however, embodiments are not limited to the specific methods and instrumentalities disclosed.

DETAILED DESCRIPTION

Figure 1:
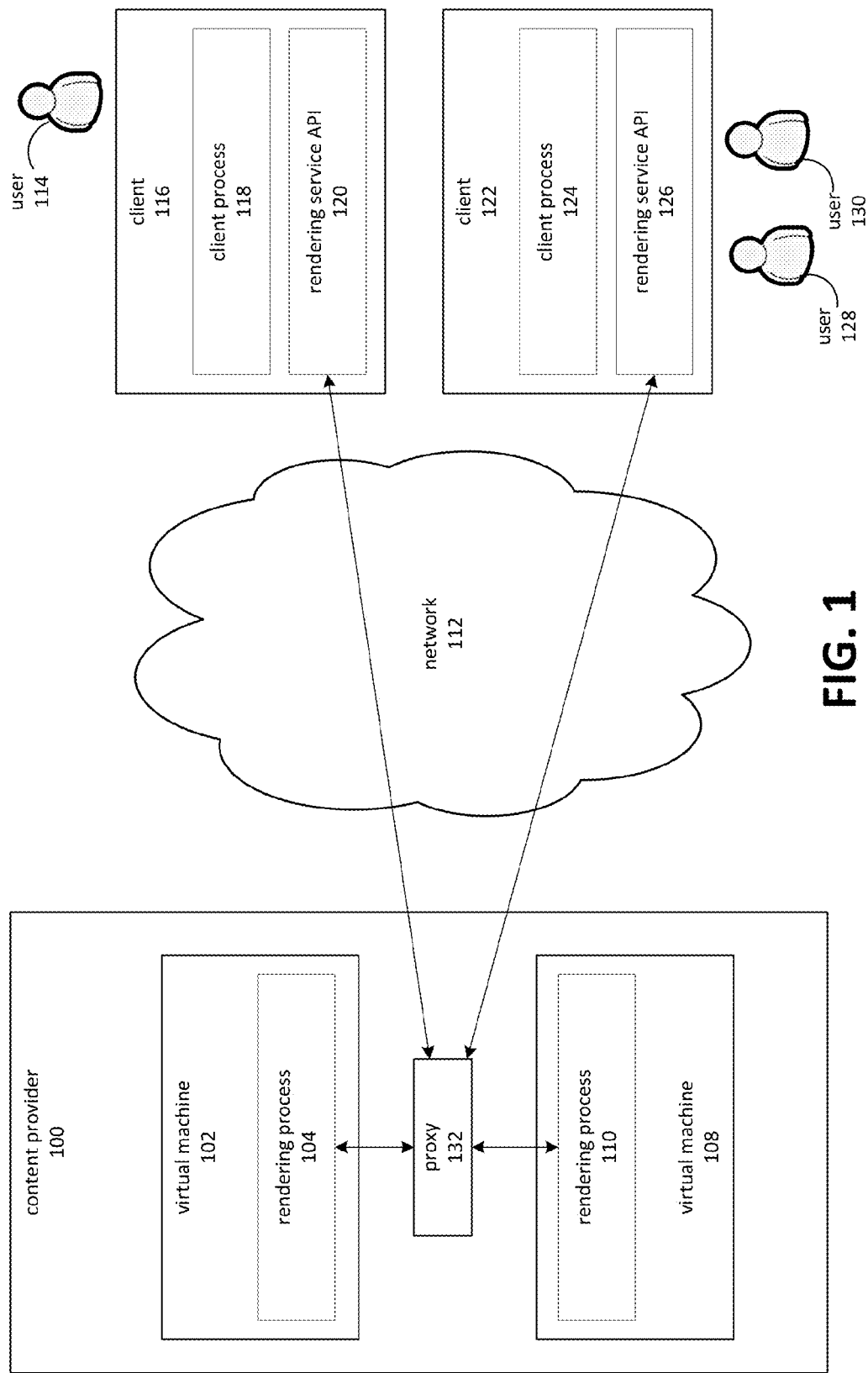
FIG. 1 is a block diagram depicting an example of a system for providing remote rendering services to client processes.

In accordance with some example features of the disclosed techniques, one or more rendered views of a scene of a particular content item, such as a video game, may be generated by a content provider and transmitted from the provider to multiple different clients. In some cases, a content provider may generate multiple views of a scene or virtual environment of a particular content item. Each of the multiple views may, for example, be associated with one or more respective clients and may be transmitted from the content provider to the respective clients. For example, each view may present scenes from a viewpoint of a particular character or other entity controlled by a respective client to which the view is transmitted. The views may be based on a shared state of a game or other video content maintained by the content provider. In some cases, the content provider may transmit an identical view of a scene of a particular content item to multiple clients. Identical views may, for example, be transmitted to clients viewing a game from the viewpoint of a particular character.

A content provider may provide rendering services through rendering processes. In some cases and embodiments, a rendering process may correspond to an instance of an executable application. However, a rendering process may instead comprise component invocations, library calls, objects, multiple instances of an executable application and so on.

A rendering process may be associated with a set of one or more clients. Each client may in turn be associated with one or more users. A rendering process may be associated with a particular content item, such as a game, animation, television program and so forth. A rendering process may also be associated with an instance of a content item. For example, a multiplayer game may provide interaction between a set of clients. In such cases, embodiments may associate a rendering process with the set of clients. In some cases and embodiments, multiple rendering processes may be associated with an instance of a game, and each rendering process associated with one or more clients. This approach might be employed, for example, in a massively multiplayer game or a group viewing of a movie or television show.

To enable generation of a single shared state of display content and to select, from within that state, the one or more views of a scene, each of the different participating clients may collect respective client state information. The client state information may include, for example, information regarding operations performed at the respective client such as movements or other actions performed by a respective character or other entity controlled by the respective client. A client may periodically transmit an update of its respective client state information to the content provider. The content provider may then use the client state information updates received from each client to update shared content item state information maintained by the content provider. The content provider may then use the shared content item state information to generate the one or more views transmitted to the different participating clients.

Client state information may also include information related to or reflective of input by a user of a client. For example, a user of a client may press a button, move a joystick, speak into a microphone and so forth. Input from a client, such as the examples presented, may result in movements or other actions performed by a respective character or other entity controlled by the respective client. In some cases and embodiments, input may not be related to a control of a game character. Input could also correspond to the presence of a user. For example, a motion-sensitive camera might indicate that a user of the client is present.

In some embodiments, client state information may comprise information about spectator status, recording status, and so on. For example, a user may be a spectator in a multiplayer game, in which case client state information may contain information indicating the presence of the spectator, even though the spectator might not be providing input to the client, or is providing input intermittently. In another embodiment, a client device might be recording information, in which case client state information might comprise an indication that transmitted content is being recorded. Some embodiments may utilize rendering services to enable viewing of movies, television, sporting events and so forth. In one such embodiment, client state information may pertain to receiving textual, audio, or other input from a user commenting on the displayed content.

Receipt of client state information may be indicative of starting, resuming or continuing an active state of a rendering process associated with one or more clients. The content provider or rendering process may receive various transmissions or messages containing data corresponding to or indicative of client state information. Client state information indicative of an active state of a rendering process includes, but is not limited to, input by a user, presence of a user, a spectator state, a recording state and so on.

A rendering process may be executed on an instance of a virtual machine, or on other types of computing nodes in addition to virtual machine instances. Virtual machine instances may also be referred to as virtual machines. In some embodiments, there may be a one-to-one association of a rendering process to a computing node. In other embodiments, multiple rendering processes may be executed on the same computing node. Embodiments may associate rendering processes corresponding to a same content item to the same computing node. This approach may enable rendering processes to share content-related graphics resources.

A content provider may improve efficiency of its operations by maximizing computing resources available to rendering processes that are active. A virtual machine on which a rendering process executes may consume resources that might otherwise be available to other virtual machines executing other rendering processes. In order to maximize computing resources available to virtual machines running active rendering processes, those virtual machines that are running inactive rendering processes may be suspended. An inactive rendering process may be an executing process whose state of execution is retained in the state of the suspended virtual machine.

An inactive rendering process may include rendering processes whose clients do not have a current need for rendering services. In various cases and embodiments, client state information may be received by the content provider. The client state information may be indicative of a current need for rendering services, which may for example correspond to factors such as movement of an element of the content, input by a user of a client, spectator mode, recording mode and so on. In various cases and embodiments, a pause in receiving client state information may be indicative of no current need for rendering services. This might occur, for example, when a client device has shut down. Another possibility is that a client state may have changed so that rendering services are no longer needed. For example, a game running on the client may have ended and a new game has not yet started.

FIG. 1 depicts an example, consistent with aspects of the present embodiment, of a system for managing rendering processes on virtual machines. User 114 may interact with client 116. A client may comprise a hardware device such as a mobile phone, tablet, gaming console, personal computer and so on. The client may also comprise application programs 118, operating system or other software modules, in various combinations. A client may also comprise a rendering service application programming interface ("API") 120, which may provide client process 118 with access to a rendering process, such as rendering process 104. Client processes may also communicate with a rendering process directly. For example, client process 124 might communicate with rendering process 110, or invoke a function of rendering service API 126 to communicate with rendering process 110.

Access to rendering process 104 may be direct or indirect. For example, direct access could include client 116 communicating with rendering process 104 through network 112. Indirect access could include client 122 accessing rendering process 110 through content provider 100. In some embodiments, a proxy 132 may operate within content provider 100 to broker access to rendering processes, such as rendering process 110. A proxy might also operate within virtual machine 102 or virtual machine 108.

Multiple users such as user 128 and user 130 may interact with a client such as client 122. Interaction with a client, such as client 122, may comprise various actions and events. Non-limiting examples of interactions include game controller movements, microphone input, camera input and so on. Interactions may be incorporated into client state information. Client state information may comprise information indicative of a number of users of a client. The information may include information that allows deduction of the number of active users. For example, client state information may comprise actions by a number of users. A number of clients may be inferred based on a time-to-last metric corresponding to an input action by a user of a client, such as user 128 or user 130 of client 122. A count of active users associated with a client may be used to determine whether to maintain an active state of a rendering process, such as rendering process 110 on virtual machine 108. For example, if user 128 and user 130 cease interacting with client 122, rendering process 110 might enter into an inactive state to minimize resource consumption. This might be accomplished, for example, by suspending virtual machine 108. Another possibility is that both user 128 and user 130 activate a pause function for client process 124. This might occur, for example, by users 128 and 130 both switching to an alternative application.

Figure 2:
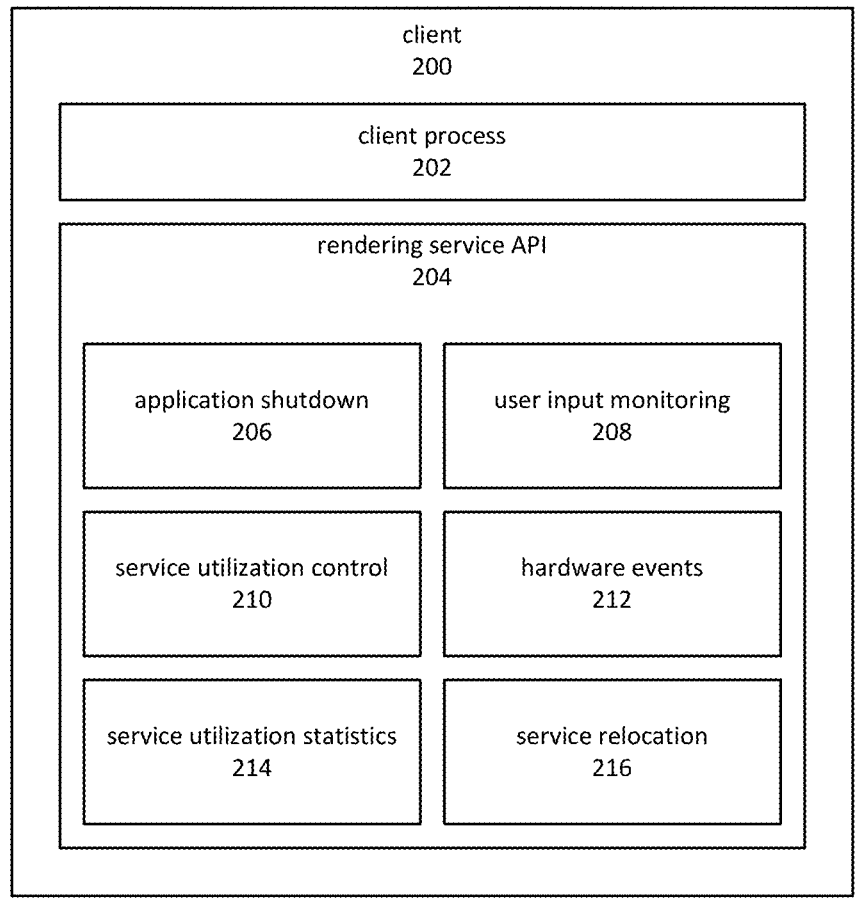
FIG. 2 is a block diagram depicting a client configured to utilize a remote rendering service.

FIG. 2 depicts an embodiment of a client 200 comprising at least one client process 202 and at least one rendering service API 204. Client process 202 may comprise one or more modules implementing various aspects of an application's functionality. Applications include, but are not limited to, video games, video playback services, video editing, animation, simulation and so forth. Modules may include any combination of computer-readable instructions, circuitry, and so forth. A module may, for example, include statically and dynamically linked libraries, business objects, component objects, graphics processing units, physics processing units and so on.

A rendering service API may act as a component of client process 202. It may comprise one or more modules implementing various pieces of functionality. Although rendering service API 204 is depicted in FIG. 2 as containing various modules implementing specific pieces of functionality, such as application shutdown 206, those of ordinary skill in the art will appreciate that various combinations comprising additions, subtractions, substitutions and rearrangements are possible.

Application shutdown 206 depicts a module of rendering service API 204 that receives indications related to the running state of client process 202. It may, for example, receive a notification that client process 202 is going to be shut down, suspended or paused. It may then send notification to a content provider, which includes any proxy or rendering processes operated within the content provider. The notification indicates that services associated with that application may be suspended.

User input monitoring 208 may involve tracking user activity related to client process 202. It may also involve representing user activity as client state information, which may be transmitted from the client to a content provider.

Service utilization control 210 may involve monitoring or responding to events affecting a level of rendering processes likely to be requested by client process 202. These events include transitions of game state, such as from a state involving activate gameplay to a state involving display of a pre-rendered scene, for which rendering services are not presently required. The events may be controlled by client process 202 via function calls, method calls or similar techniques, invoked on a module of rendering service API 204. Service utilization events may be sent, for example as client state information, to a content provider.

Hardware events 212 may detect and respond to various hardware events, including but not limited to client device shutdown, controller shutdown, display shutdown, system suspend, system resume, and so on. These events may also be indicative of a level of rendering processes likely to be requested by client process 202. Information indicative of hardware events may be transmitted, for example as client state information, to a content provider.

Service utilization statistics 214 may relate to collection of information pertaining to use of rendering services by the game, the game's publisher, hardware provider or other entity. In some embodiments, certain aspects of these services may be performed directly by rendering service API 204. This might, for example, include causing reports to be generated and/or transmitted. The reports might pertain to various usage statistics such as a level of usage performed on behalf of a particular client. In some embodiments, service utilization statistics 214 may indirectly participate in generation of relevant statistics, for example by transmitting identifying information to a content provider. Identifying information may include user information, client device information, game information, publisher information and so on. Cryptographic techniques may be employed to prevent tampering with a provided identity.

Service relocation 216 may pertain to re-association of a content provider, proxy, virtual machine, or rendering process with a different address, such as a different internet protocol ("IP") address. Re-association may occur based on various events, such as utilization balancing, failover or other scenarios. For example, a state corresponding to a suspended virtual machine might be moved from one host to another, and be assigned a different IP address after the move. Embodiments might also relocate a rendering process from one virtual machine to another.

Figure 3:
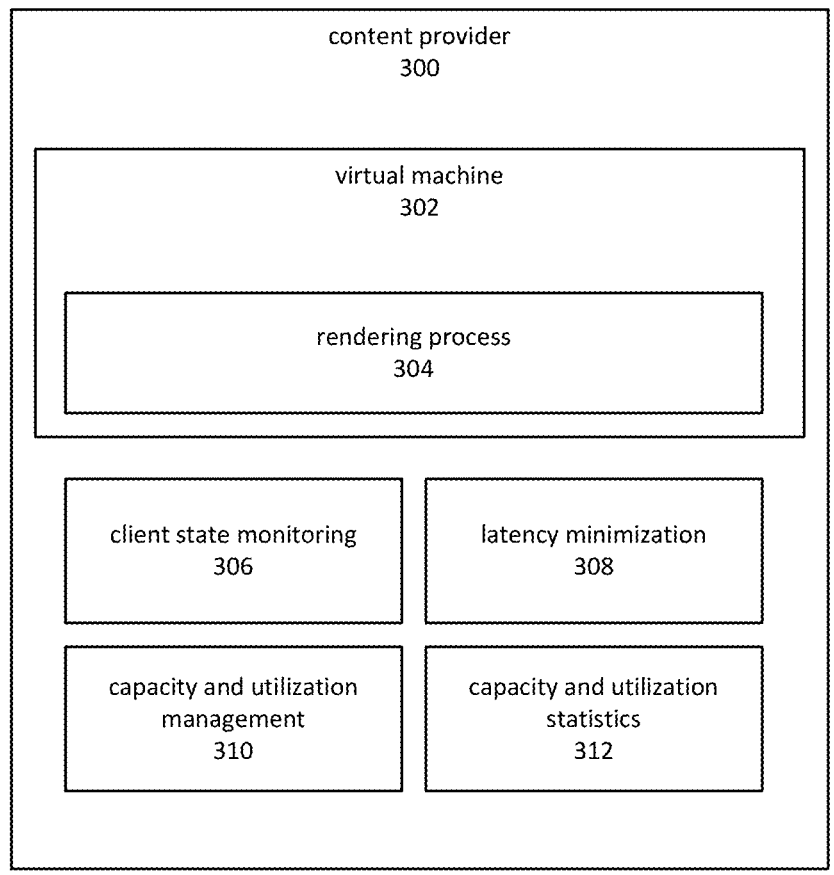
FIG. 3 is a block diagram depicting an example content provider system in which rendering processes are executed on virtual machine instances.

FIG. 3 depicts an embodiment of a content provider 300 hosting rendering services on virtual machine 302. Although FIG. 3 depicts one virtual machine, content providers may host a number of virtual machines. A content provider may include one or more computing facilities such as data centers, clusters of servers, individual servers and so on. Various virtual machines may operate within a content provider. For example, a computing facility may operate various computing hosts, on which a hypervisor and one or more virtual machines operate. Various control facilities may be employed to create, remove, shut down, restart, suspend and reactivate virtual machines.

A content provider may manage state information for virtual machines. A virtual machine may have an associated state which may be stored on a storage device. The state for a suspended or shut down virtual machine may be stored in a low-latency cache. A low-latency cache includes, but is not limited to, random access memory, in-memory databases, solid-state storage devices and so forth. The state for a suspended virtual machine may also be stored on a storage device that, compared to low-latency options, may be described as high-latency. Distinctions between low-latency and high-latency storage options may be based on factors other than qualities of an underlying storage device. Instead, in some embodiments low and high latency storage may be distinguished by overall system latency, which may be influenced by factors such as network speed, traffic congestion and so on.

A rendering process 304 may be assigned to operate on virtual machine 302. The rendering process may provide various services related to graphics processing, such as managing graphics resources, and rendering graphical scenes. A render process may perform one or more steps of a rendering pipeline. A rendering pipeline may comprise various data structures, resources, and stages such as shape buffers, vertex buffers, textures buffers, input assembly, texture mapping, shading, render targets and so forth. Embodiments may include support for various types of pipelines, including but not limited to 2-dimensional and 3-dimensional rendering, physics processing pipelines and so on.

Various modules may perform functions related to operation of rendering process 304. Although FIG. 3 depicts these modules as distinct entities, it will be appreciated that the depicted modules may be reordered, rearranged, combined, altered or omitted in various combinations. In addition, although depicted in FIG. 3 as elements distinct from rendering process 304 and virtual machine 302, some or all of the functions performed by the depicted modules may be performed by rendering process 304 and/or virtual machine 302.

A module for client state monitoring 306 may receive and/or process client state information pertaining to a client of a rendering process. Embodiments may monitor client state information to determine the presence or absence of user activity, and may further classify the activity as being indicative of maintaining an active state of a rendering process associated with the client. An active state of a rendering process may be indicated by factors such as user input, requests by a client to maintain an active state despite a period of inactivity, initialization of a new application on a client and so forth. A rendering process may be maintained in an active state based on receipt of information indicative of activity on a client, which may be transmitted to a content provider as client state information. Activity on a client may refer, for example, to receipt of user input, requests for rendering services, active execution of a rendering process and so forth.

Client state information may also be indicative of transitioning to an inactive state. A lack of activity may correspond to various conditions which may suggest transitioning to an inactive state of the rendering process. For example, a dropped network connection may interrupt communication between a rendering process and a client, in which case embodiments may cause the rendering process to transition to an inactive state. Client state monitoring 306 may track or receive information pertaining to a last time user input, initialization of a new application or other information pertaining to client activity was received. If this time exceeds a threshold, client state monitoring 306 may determine that rendering process 304 should enter into an inactive state. Embodiments may, upon receiving information corresponding to an active state of a rendering process, cause an inactive rendering process to transition to an active state.

A rendering process may transition to an active state by suspending the virtual machine on which it runs. In some embodiments, a suspended virtual machine may remain in its host's primary memory, but not consume central processing unit cycles. In another embodiment, a state for a suspended virtual machine may be stored in a low-latency cache, or on other forms of storage devices. In another embodiment, a state for a suspended virtual machine may transition from in-memory to low-latency cache to higher-latency storage, based on the period of time a corresponding rendering process has been inactive. A latency minimization module 308 may perform various actions to minimize latency in accessing rendering processes. These actions may include, but are not limited to, moving a state of a suspended virtual machine to or from main memory, cache, or relatively high-latency storage, based on a state of a client associated with a rendering process executing on a virtual machine.

A capacity and utilization management module 310 may perform various actions to improve resource utilization. In some cases and embodiments, virtual machine 302 might host a number of rendering processes. Embodiments may assign rendering processes to a virtual machine based on factors including, but not limited to, a common client device, a common user, a common set of game content and so forth.

Embodiments may also attempt to improve factors such as resource utilization, latency and so forth by assigning rendering processes to virtual machines in accordance with improving these factors. In some embodiments, capacity and utilization management 310 may involve assigning rendering processes and/or virtual machines to computing resources based on processing power of those resources. For example, in some cases and embodiments client state information might contain an indication of a requested level of rendering services. Based on the indication, a virtual machine host might be selected to operate a rendering process, based partly on processing power available to the selected host.

Another module may perform various actions related to capacity and utilization statistics 312. These actions may include maintaining records on rendering services provided to a user, client, application, application publisher and so forth. In some embodiments, content providers may monitor usage statistics such as throughput, pages rendered, CPU cycles consumed and so forth. Content providers may employ various usage statistics such as these to impose a service charge on entities such as a game publisher.

Figure 4:
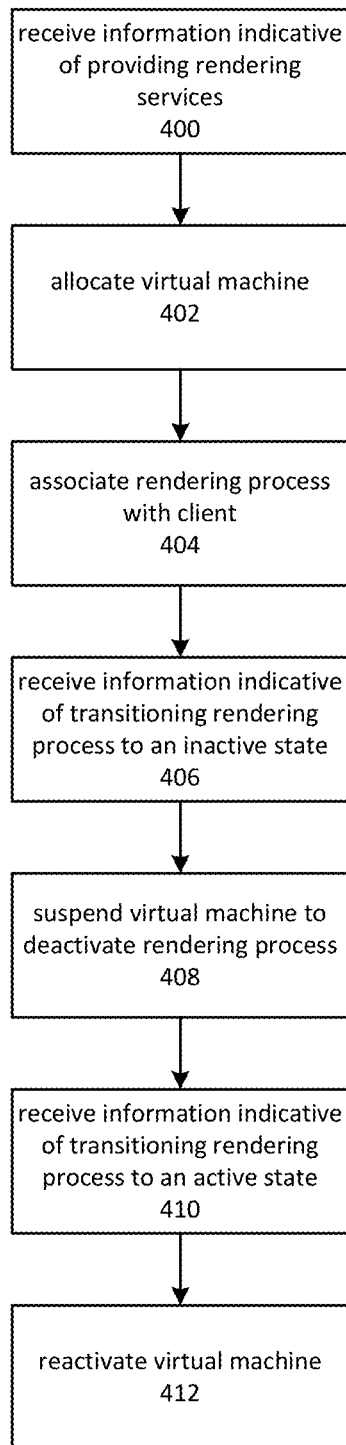
FIG. 4 is a flowchart depicting an example process for activating and deactivating rendering processes executing on virtual machine instances.

FIG. 4 depicts an embodiment of a process for managing rendering processes. Although depicted as a sequence of operations, those of ordinary skill in the art will appreciate that the depicted order should not be construed as limiting the scope of the present disclosure and that at least some of the depicted operations may be altered, omitted, reordered or performed in parallel.

Operation 400 may involve receiving information indicative of providing rendering services to a client. Embodiments may receive client state information corresponding to initialization of an application that will use rendering services. The initialized application instance, and/or the client on which it runs, may be associated with a rendering process. Embodiments may perform a mapping or lookup operation to determine if an application instance and/or client is already associated with a rendering process. If not, a new rendering process may be created.

Operation 402 depicts allocating a virtual machine on which the rendering process may execute. Allocating a virtual machine may involve reusing an existing instance of a virtual machine, creating a new instance, copying a pre-existing instance and so on. Embodiments may, for example, form a copy of a pre-defined image of a virtual machine state, where the pre-defined image corresponds to an initial state of a virtual machine that is configured to execute a rendering process. In some embodiments, an image of a virtual machine may be used in which a rendering process has already begun executing but has not yet served any clients. In some cases and embodiments, a virtual machine image may contain a rendering process that has begun executing and has loaded resources corresponding to a particular application, such as a specific game program. The virtual image may be recorded at that point, after resource loading but prior to having provided services to a client. Images corresponding to virtual machines in these and other initial states may be stored and subsequently loaded when preparing a virtual machine to provide rendering services to a client.

A virtual machine may be allocated for executing a rendering process based on the virtual machine having access to graphics resources associated with a process, such as a game, running on a client of the rendering services. The game running on the client may rely on graphics resources accessible to the rendering process executing on the virtual machine. Having access to graphics resources may include connectivity to storage devices having the graphics resources stored thereon. Another possible variation, among many, includes a virtual machine image in which a rendering process has pre-loaded graphics resources related to the game or other application.

Operation 404 depicts associating a rendering process executing on a virtual machine with a client. Embodiments may maintain a record of an association between a client and the rendering process and/or the virtual machine on which the rendering process operates. The association may be maintained, in some embodiments, in a database or other data store operating independently of the virtual machine. Received client state information may be correlated with a rendering process based on the recorded association. For example, client state information might be received by a content provider and the corresponding rendering process could be determined based on the recorded association.

A rendering process may be described as executing on or operating on a virtual machine. The terms "executing on" and "operating on" are intended to encompass a variety of states in which a rendering process begins or continues execution on a virtual machine.

Operation 406 depicts receiving information indicative of transitioning a rendering process to an inactive state. Embodiments may determine that a rendering process should transition to an inactive state based on a predicted maximum period of inactivity being exceeded. In various embodiments, a time may be recorded to indicate when client state information was last received, where the client state information indicates that a corresponding rendering process should remain active. Embodiments may then compare the amount of time since last receiving such information to a threshold amount of time. If the amount of time exceeds the threshold level, embodiments may transition a rendering process to an inactive state. A predicted maximum period of inactivity may be used as the threshold. The predicted maximum may be a fixed value or a dynamic value determined based in part on prior periods of activity or inactivity.

Operation 408 depicts suspending a virtual machine to deactivate a rendering process operating on the virtual machine. In some embodiments, the suspending virtual machine may remain in the primary memory of its host but its virtual processors may cease execution. In another embodiment, the virtual machine may be removed from memory and stored on a storage device. Embodiments may, for example, store a state corresponding to the virtual machine in a low-latency cache, or on other storage devices. Embodiments may perform various combinations of these actions. For example, embodiments may determine to perform one of these actions based on an expected or predicted period of inactivity by the client. For example, if client state information indicates that a game has entered a known period of inactivity (for example when a pre-rendered video is being displayed), the virtual machine might remain inactive but in memory. On the other hand, if a client has been turned off, the virtual machine might be moved to a comparatively high-latency storage device, or deleted.

A virtual machine may be suspended upon determining that a number of active rendering processes on the virtual machine has fallen below a threshold level. In some embodiments, such as those that map rendering processes to virtual machines on a one-to-one basis, the threshold level may be one. Other embodiments may host multiple rendering processes on a virtual machine. Embodiments may therefore suspend the virtual machine when all rendering processes hosted by the virtual machine have become inactive. Further embodiments may transfer active rendering processes to another virtual machine when the number of active rendering processes falls below a threshold number.

Operation 410 depicts receiving information indicative of transitioning a rendering process from an inactive state to an active state. For example, a rendering process may have been deactivated based on a pause event. Upon receiving client state information indicating that the client has been un-paused, a rendering process associated with the client may be reactivated.

Operation 412 depicts reactivating a rendering process by reactivating the virtual machine on which the rendering process was executing. Reactivating the virtual machine may comprise steps such as retrieving a state for the virtual machine from storage or from a low-latency cache. Reactivation may also comprise resuming execution of virtual processors associated with the virtual machine. A content provider may send status information pertaining to resuming operations of a rendering service. For example, a content provider might send a client information that is indicative of the amount of time resuming operation of the rendering service is expected to take. This might include, for example, estimated time to completion, percent complete and so forth.

Figure 5:
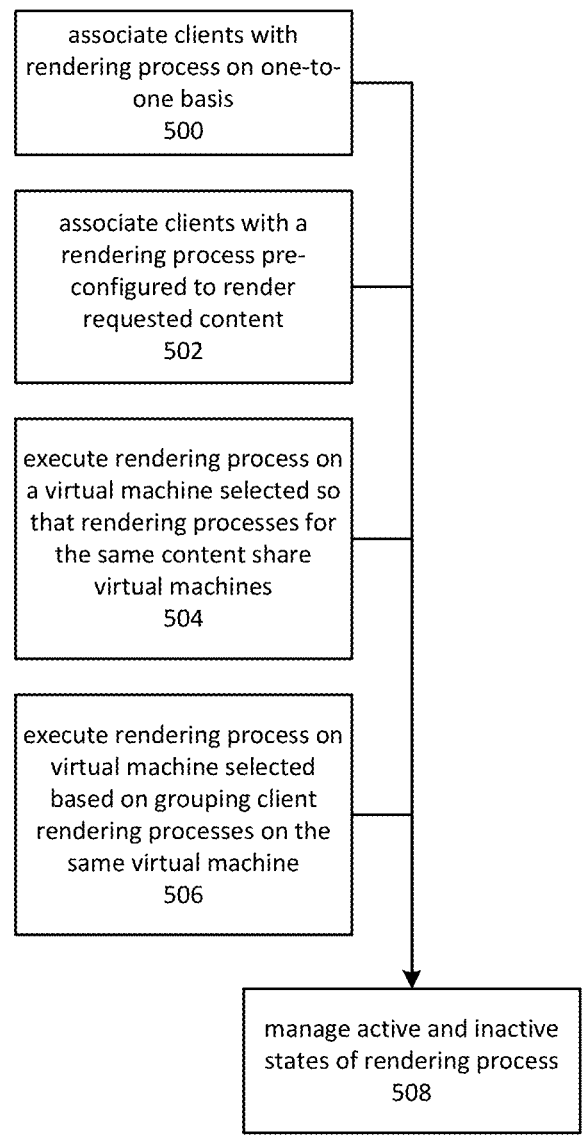
FIG. 5 is a flowchart depicting an example process for associating clients with rendering processes and virtual machine instances on which the rendering process may execute.

FIG. 5 depicts another embodiment of a process for managing rendering processes. Although depicted as a sequence of operations, those of ordinary skill in the art will appreciate that the depicted order should not be construed as limiting the scope of the present disclosure and that at least some of the depicted operations may be altered, omitted, reordered or performed in parallel.

A client may be associated with a rendering process which may provide rendering services to the client. The rendering process may be executed on a virtual machine selected based on a variety of factors. Operations 500 through 506 depict non-limiting examples of factors that may be used to associate a client with a rendering process and/or to select a virtual machine to execute the rendering process.

Operation 500 depicts associating clients to a rendering process on a one-to-one basis, so that each client is mapped to a rendering process that provides rendering services only to that client. Embodiments may also map rendering processes on a one-to-one-basis to an application, so that a given rendering process provides rendering services only to one application. In some embodiments, multiple rendering processes may be assigned to a client, or multiple clients to one rendering service.

Operation 502 depicts associating a client with a rendering process that is pre-configured to render requested content. For example, embodiments might retain an image for a virtual machine in a state in which a rendering process had begun executing in preparation for providing rendering services related to specific content, such as a particular game application. This may allow various wireframes, textures, and so forth to be pre-loaded prior to an association between a rendering service and a client.

Operation 504 depicts determining to execute a rendering process on a virtual machine that is selected based on the content being rendered by other processes executing on the same virtual machine. This approach may allow memory blocks containing graphical resources to be shared among multiple rendering processes providing rendering services for the same content.

Operation 506 depicts executing a rendering process on a virtual machine that is selected based on grouping rendering processes for a particular client on one virtual machine, or on a minimized number of virtual machines. For example, a client might execute two applications, each of which requires rendering services. An application might then be associated with its own, dedicated rendering process. These rendering processes may be grouped so as to execute on the same virtual machine. In some embodiments, rendering processes associated with the same client are grouped on a virtual machine, so that rendering processes associated with other clients are excluded from that virtual machine.

Operation 508 depicts managing active and inactive states of rendering processes executing on virtual machines. This may comprise suspending a virtual machine in order to deactivate one or more rendering processes operating on the virtual machine. In some embodiments, where multiple rendering processes are employed, the virtual machine may be suspended when all rendering processes should transition to an inactive state. Embodiments may leave all rendering processes operating on a virtual machine in an active state until each rendering process is able to transition to an inactive state, and then suspend the virtual machine. Embodiments may determine to transition a rendering process to an inactive state when various events occur, including but not limited to a delay in receiving client state information indicative of a need for rendering services.

Figure 6:
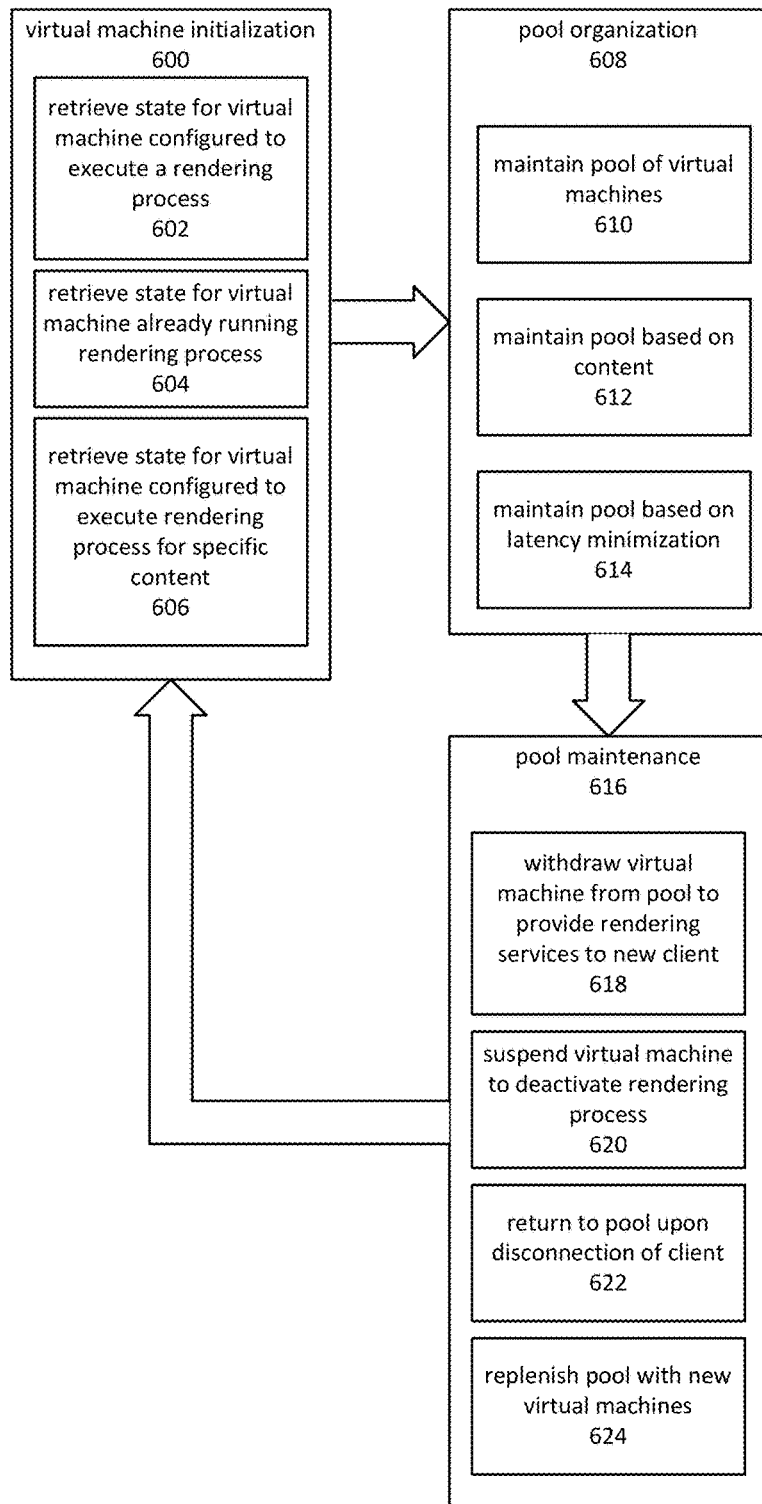
FIG. 6 is a flowchart depicting an example process for maintaining a pool of virtual machine instances configured to execute rendering processes.

Embodiments may employ various approaches to prepare virtual machines for executing rendering processes. FIG. 6 depicts an embodiment of a process for maintaining pools of virtual machines. Although depicted as involving a sequence of operations, those of ordinary skill in the art will appreciate that the depicted order should not be construed as limiting the scope of the present disclosure and that at least some of the depicted operations may be altered, omitted, reordered or performed in parallel.

Virtual machine initialization 600 involves various aspects of creating, starting, and configuring virtual machines for use in executing a rendering process. Various operations, such as those depicted by operations 602, 604, and 606 may be performed to instantiate virtual machines for use in executing a rendering process. The operations depicted by 602, 604, and 606 may be combined in various ways to form further embodiments of the present disclosure.

Operation 602 depicts retrieving state information for a virtual machine configured to execute a rendering process. A virtual machine state may be stored as a file, and may sometimes be referred to as a virtual machine image. In various embodiments, the virtual machine state may correspond to a virtual machine that has been pre-configured to execute a rendering process. For example, the virtual machine may have an installed operating system. Any files used to execute a rendering process may have already been copied to the virtual machine, and any necessary configuration steps performed.

Operation 604 depicts retrieving state information for a virtual machine that is already executing a rendering process. Embodiments may utilize a virtual machine image in which the state of the machine reflects a rendering process that is currently executing but not yet associated with or providing service to a client.

Operation 606 depicts retrieving state information for a virtual machine configured to execute (or already executing) a rendering process related to specific content. For example, a virtual machine image might be saved at a point in which a rendering process has begun executing and has loaded resources for a particular application, such as a game. The resources might include bitmaps, textures, wire-frame models and so on.

Embodiments may select a virtual machine from the pool based on the selected virtual machine being configured to execute a rendering processes having access to graphics resources related to the application for which graphics rendering services are being provided. In some cases, a rendering process may be specifically configured to have access to the graphics resources. In other cases the selected virtual machine may be configured to have access to the graphics resources.

Pool organization 608 refers to various operations that may be performed to form pools of virtual machines for executing rendering processes. As used herein, the term pool may refer to various collections of objects, such as collections of virtual machines. The collections may be organized by data structures such as lists or arrays, or by various classification methods. In various embodiments, a pool may be a collection or set of objects or resources which may be withdrawn from the pool as needed. For example, a pool may contain a set of unused virtual machines that may be withdrawn from the pool and used to execute a rendering process.

Operation 610 depicts maintaining a pool of virtual machines. Maintaining a pool may involve creating virtual machines, placing the virtual machines in the pool, withdrawing virtual machines from the pool and returning the virtual machines to the pool. Embodiments may maintain a minimum and/or maximum number of free virtual machines in the pool.

Operation 612 depicts maintaining a pool of virtual machines based on content. This may involve classifying virtual machines in the pool as belonging to a particular set of content. When a virtual machine is withdrawn from the pool, a virtual machine appropriate to the particular content set may be withdrawn. For example, virtual machines configured to pre-load resources for a particular game might be grouped in a pool. When a client requests rendering services for that particular game, a virtual machine from that pool may be used. Clients associated with different applications may obtain virtual machines drawn from a different pool.

Operation 614 depicts maintaining a pool of virtual machines based on latency minimization. Embodiments may employ a variety of factors to organize such pools. In one embodiment, virtual machines are grouped according to geographic location of each virtual machine's host. Virtual machines may be withdrawn from the pool based on the locations of the hosts and the locations of a client requesting rendering services. Pools may also be organized according to speed, capacity and so on.

Embodiments may combine pools into various combinations of pools and sub-pools. For example, virtual machines could be grouped into pools organized by content, and into sub-pools organized by geographic region.

Pool maintenance 616 involves various operations performed to withdraw, utilize, and return virtual machines to a pool of virtual machines. As depicted by operation 618, a virtual machine may be withdrawn from a pool in order to provide rendering services to a new client. Operation 620 depicts suspending the virtual machine, without immediately returning it to the pool, to temporarily deactivate a rendering process. At some later time, the virtual machine may be returned to the pool. Operation 622 depicts one example, in which a virtual machine is returned to a pool upon the disconnection of a client. Some embodiments may delete virtual machines when they are no longer needed. Operation 624 depicts replenishing the pool of virtual machines, for example by performing one or more of the operations associated with virtual machine initialization 600. Virtual machines may be replenished so that a minimum number of virtual machines are kept available in the pool, or to replace virtual machines that have been removed from the pool and subsequently deleted.

Figure 7:
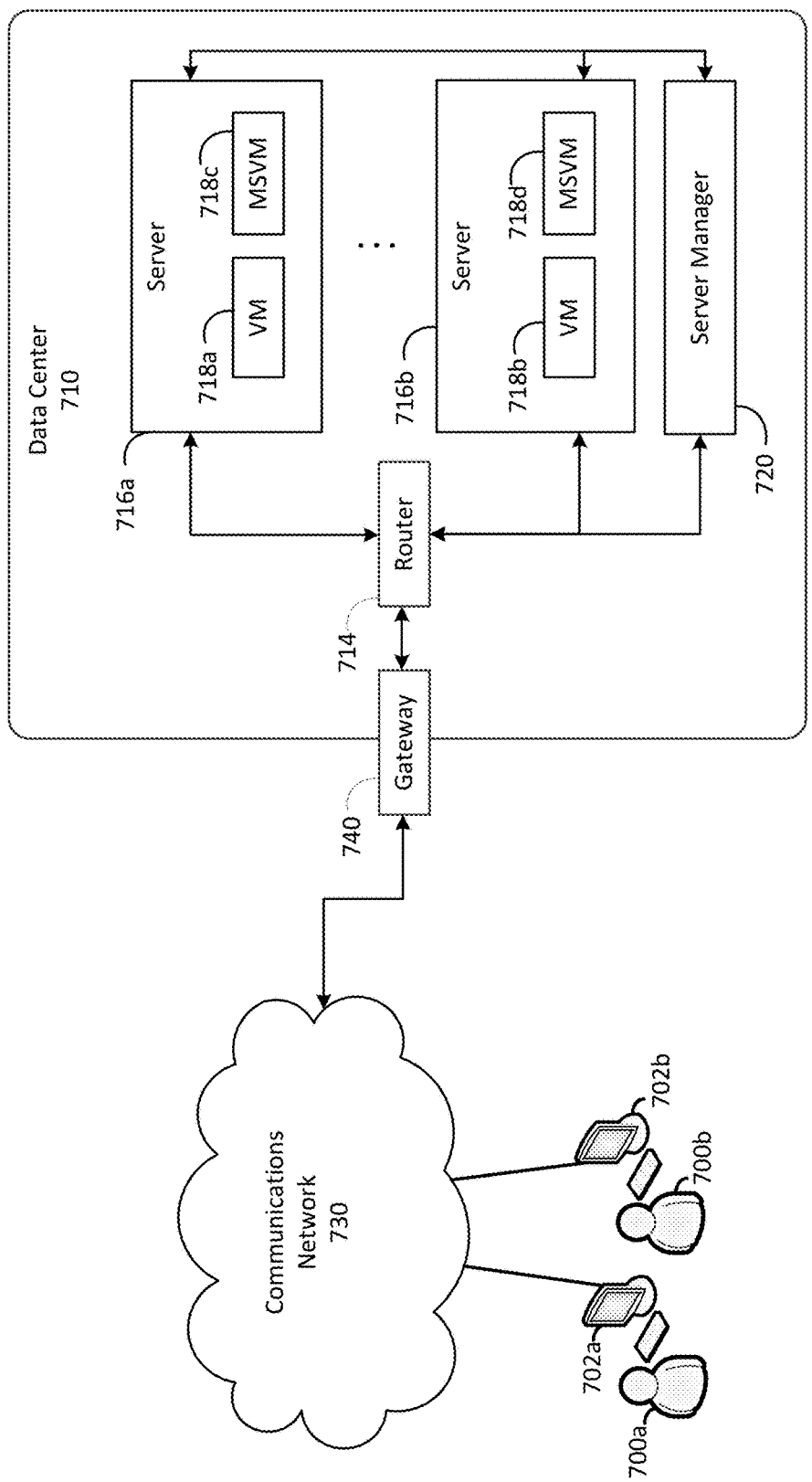
FIG. 7 is a block diagram depicting an example computing system that may be used in some embodiments.

A content provider may, in some cases, render and transmit content item views to clients over an electronic network such as the Internet. Content may, in some cases, be provided upon request to clients using, for example, streaming content delivery techniques. An example computing environment that enables rendering and transmission of content to clients will now be described in detail. In particular, FIG. 7 illustrates an example computing environment in which the embodiments described herein may be implemented. FIG. 7 is a diagram schematically illustrating an example of a data center 710 that can provide computing resources to users 700a and 700b (which may be referred herein singularly as user 700 or in the plural as users 700) via user computers 702a and 702b (which may be referred herein singularly as computer 702 or in the plural as computers 702) via a communications network 730. Data center 710 may be configured to provide computing resources for executing applications on a permanent or an as-needed basis. The computing resources provided by data center 710 may include various types of resources, such as gateway resources, load balancing resources, routing resources, networking resources, computing resources, volatile and non-volatile memory resources, content delivery resources, data processing resources, data storage resources, data communication resources and the like. A computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 710 may include servers 716a-b (which may be referred herein singularly as server 716 or in the plural as servers 716) that provide computing resources. These resources may be available as bare metal resources, or as virtual machine instances 718a-d and (which may be referred herein singularly as virtual machine instance 718 or in the plural as virtual machine instances 718). Virtual machine instances 718c and 718d are shared state virtual machine ("SSVM") instances. The SSVM virtual machine instances 718c and 718d may be configured to perform all or any portion of the shared content item state techniques and/or any other of the disclosed techniques in accordance with the present disclosure and described in detail below. As should be appreciated, while the particular example illustrated in FIG. 7 includes one SSVM virtual machine in each server, this is merely an example. A server may include more than one SSVM virtual machine or may not include any SSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a virtual machine instance with multiple virtual processors that spans multiple distinct physical computing systems.

Referring to FIG. 7, communications network 730 may, for example, be a publicly accessible network of linked networks and possibly operated by various distinct parties, such as the Internet. In other embodiments, communications network 730 may be a private network, such as a corporate or university network that is wholly or partially inaccessible to non-privileged users. In still other embodiments, communications network 730 may include one or more private networks with access to and/or from the Internet.

Communication network 730 may provide access to computers 702. User computers 702 may be computers utilized by users 700 or other customers of data center 710. For instance, user computer 702a or 702b may be a server, a desktop or laptop personal computer, a tablet computer, a wireless telephone, a personal digital assistant (PDA), an e-book reader, a game console, a set-top box or any other computing device capable of accessing data center 710. User computer 702a or 702b may connect directly to the Internet (e.g., via a cable modem or a Digital Subscriber Line (DSL)). Although only two user computers 702a and 702b are depicted, it should be appreciated that there may be multiple user computers.

User computers 702 may also be utilized to configure aspects of the computing resources provided by data center 710. In this regard, data center 710 might provide a gateway or web interface through which aspects of its operation may be configured through the use of a web browser application program executing on user computer 702. Alternately, a stand-alone application program executing on user computer 702 might access an application programming interface (API) exposed by data center 710 for performing the configuration operations. Other mechanisms for configuring the operation of various web services available at data center 710 might also be utilized.

Servers 716 shown in FIG. 7 may be standard servers configured appropriately for providing the computing resources described above and may provide computing resources for executing one or more web services and/or applications. In one embodiment, the computing resources may be virtual machine instances 718. A virtual machine instance may be referred to as a virtual machine. As discussed above, each of the virtual machine instances 718 may be configured to execute all or a portion of an application. In the example of virtual machine instances, Data center 710 may be configured to execute an instance manager 720a or 720b (which may be referred herein singularly as instance manager 720 or in the plural as instance managers 720) capable of executing the virtual machine instances 718. The instance managers 720 may be a virtual machine monitor (VMM) or another type of program configured to enable the execution of virtual machine instances 718 on server 716, for example. It will be appreciated that the configuration of instance managers 720, as depicted by FIG. 7, is subject to change and that instance managers 720 may, for example, be configured to operate as a front-end to router 714. In some embodiments, instance managers 720 may be hosted on servers 716, or on other computing nodes.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 710 shown in FIG. 1, a router 714 may be utilized to interconnect the servers 716a and 716b. Router 714 may also be connected to gateway 740, which is connected to communications network 730. Router 714 may be connected to one or more load balancers, and alone or in combination may manage communications within networks in data center 710, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 710 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
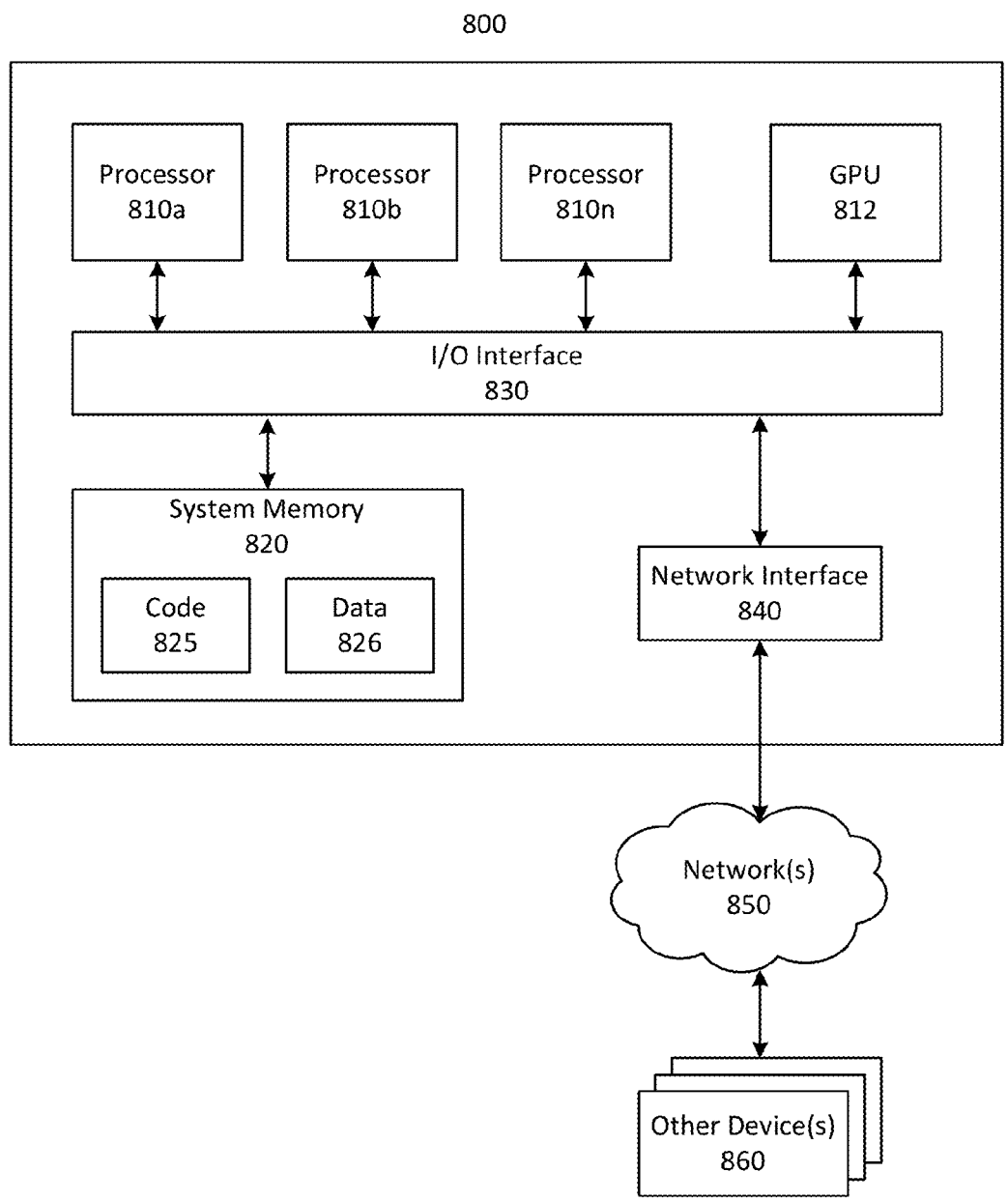
FIG. 8 is a block diagram depicting an example computing system that may be used in some embodiments.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810a, 810b and/or 810n (which may be referred herein singularly as "a processor 10" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 10 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

In some embodiments, a graphics processing unit ("GPU") 812 may participate in providing graphics rendering and/or physics processing capabilities. A GPU may, for example, comprise a highly parallelized processor architecture specialized for graphical computations. In some embodiments, processors 810 and GPU 812 may be implemented as one or more of the same type of device.

System memory 820 may be configured to store instructions and data accessible by processor(s) 810. In various embodiments, system memory 820 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between processor 810, system memory 820 and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 830. A non-transitory computer-accessible storage medium may also include any volatile or non-volatile media such as RAM (e.g. SDRAM, DDR SDRAM, RDRAM, SRAM, etc.), ROM etc., that may be included in some embodiments of computing device 800 as system memory 820 or another type of memory. Further, a computer-accessible medium may include transmission media or signals such as electrical, electromagnetic or digital signals conveyed via a communication medium such as a network and/or a wireless link, such as those that may be implemented via network interface 840. Portions or all of multiple computing devices such as those illustrated in FIG. 8 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more processors; and
   one or more memories to store a set of instructions, which if executed by the one or more processors, causes the one or more processors to perform operations comprising:
      receiving a request indicative of rendering graphics on behalf a client, the request comprising information indicative of a set of graphics resources, selecting a virtual machine from a plurality of virtual machines to execute a rendering process associated with the client based at least in part on content that is rendered by one or more other processes executing on the virtual machine;

suspending operation of the virtual machine in response to a first determination that a request to keep the rendering process in an active state has not been received and a second determination that an amount of time since receiving information indicative of input by a user of the client has exceeded a first threshold, wherein a first state of the virtual machine while suspended comprises a second state for the rendering process; and resuming operation of the virtual machine in response to receiving information indicative of input by a user of the client.

2. The system of claim 1, wherein the operations further comprise:

storing the first state of the virtual machine in a low-latency cache; and storing the first state of the virtual machine on a storage device in response to the amount of time since receiving information indicative of input by the user of the client exceeding a second threshold.

3. The system of claim 1, wherein the operations further comprise:

activating an additional virtual machine based at least in part on suspending the virtual machine.

4. The system of claim 1, wherein the request to keep the rendering process in an active state is transmittable by a process operating on the client.

5. A non-transitory computer-readable storage medium having stored thereon instructions that, upon execution by one or more computing devices, cause the one or more computing devices at least to:

receive a request indicative of performing graphics rendering services for a client, the client executing a process associated with a set of graphics resources;

select a virtual machine from a plurality of virtual machines to execute a rendering process associated with the client based at least in part on content that is rendered by one or more other processes executing on the virtual machine;

perform, by the rendering process, the graphics rendering services for the client;

suspend operation of the virtual machine based at least in part on determining that a request to keep the rendering process active has not been received and on determining that an amount of time since receiving information indicative of activity by the client has exceeded a first threshold amount of time; and resume operation of the virtual machine in response to receiving information indicative of activity by the client.

6. The non-transitory computer-readable storage medium of claim 5, comprising further instructions that, upon execution by the one or more computing devices, cause the one or more computing devices to at least:

store a state of the virtual machine in a low-latency cache.

7. The non-transitory computer-readable storage medium of claim 5, comprising further instructions that, upon execution by the one or more computing devices, cause the one or more computing devices to at least:

store a state of the virtual machine on a storage device in response to the amount of time since receiving information indicative of activity by the client has exceeded a second threshold amount of time.

8. The non-transitory computer-readable storage medium of claim 5, wherein suspending the operation of the virtual machine comprises retaining a state of the virtual machine in memory.

9. The non-transitory computer-readable storage medium of claim 5, comprising further instructions that, upon execution by the one or more computing devices, cause the one or more computing devices to at least:

activate an additional virtual machine in response to determining that a number of active virtual machines not running a rendering process has fallen below a threshold.

10. The non-transitory computer-readable storage medium of claim 5, comprising further instructions that, upon execution by the one or more computing devices, cause the one or more computing devices to at least:

suspend operation of the virtual machine based at least in part on determining that a number of active rendering processes on the virtual machine has fallen below a threshold level.

11. The non-transitory computer-readable storage medium of claim 5, wherein the request to keep the rendering process active was initiated by a process running on the client.

12. The non-transitory computer-readable storage medium of claim 11, wherein the process initiated the request in response to entering a state in which no user input is expected for a period of time.

13. The non-transitory computer-readable storage medium of claim 5, comprising further instructions that, upon execution by the one or more computing devices, cause the one or more computing devices to at least:

send information indicative of a time to resume operation of the rendering process to the client.

14. The non-transitory computer-readable storage medium of claim 5, comprising further instructions that, upon execution by the one or more computing devices, cause the one or more computing devices to at least:

transfer a state of a rendering process from the virtual machine to another virtual machine.

15. A method comprising:

receiving a request indicative of performing graphics rendering services for a client, the client executing a process associated with a set of graphics resources;

selecting a virtual machine from a plurality of virtual machines to execute a rendering process associated with the client based at least in part content that is rendered by one or more other processes executing on the virtual machine;

performing, by the rendering process operating on the virtual machine, the graphics rendering services for the client;

suspending operation of the virtual machine based at least in part on a first determination that a request to keep the rendering process in an active state has not been received, and a second determination that an amount of time since receiving information indicative of input by a user of the client has exceeded a first threshold; and resuming operation of the virtual machine in response to receiving information indicative of receiving a request to perform graphics rendering on behalf of the client.

16. The method of claim 15, wherein the request to keep the rendering process in an active state is based at least in part on entering a state in which no user input is expected for a period of time.

17. The method of claim 15, further comprising:
storing a state of the virtual machine in a low-latency cache for at least a period of time equal to a second threshold.

18. The method of claim 15, further comprising:
resetting the virtual machine to an initial state, the initial state corresponding to a state of the virtual machine prior to executing the rendering process.

19. The method of claim 15, further comprising:
sending information indicative of a status of resuming the rendering process to the client.

* * * * *